United States Patent [19]
Barker

[11] Patent Number: 6,141,682
[45] Date of Patent: Oct. 31, 2000

[54] METHOD AND APPARATUS FOR INTEGRATING INTERACTIVE LOCAL INTERNET ACCESS AND DOWNSTREAM DATA TRANSFER OVER A CABLE TV SYSTEM WITH UPSTREAM DATA CARRIED BY OTHER MEDIA

[75] Inventor: Keith R Barker, Belmont, Calif.

[73] Assignee: CyberStar, L.P., Mountain View, Calif.

[21] Appl. No.: 09/243,980

[22] Filed: Feb. 4, 1999

[51] Int. Cl.[7] ............... H04N 7/10; H04N 7/14; H04H 1/10; H04H 1/14

[52] U.S. Cl. ............... 709/217; 348/12; 348/13; 348/10; 455/3.2; 455/3.1; 455/5.1

[58] Field of Search ............... 709/217; 345/327; 348/12, 13, 6, 10; 455/3.2, 3.1, 6.1, 6.2, 6.3; H04N 7/10, 7/14, 1/00, 1/14

[56] References Cited

U.S. PATENT DOCUMENTS

5,534,913  7/1996  Majeti et al. ............... 348/7
5,961,603  10/1999  Kumkel et al. ............... 709/229

Primary Examiner—Nathan Flynn
Assistant Examiner—Vivek Srivastava
Attorney, Agent, or Firm—Perman & Green, LLP

[57] ABSTRACT

A method and apparatus for communicating between information service provider systems (ISPS) and customer premise equipment (CPE) is provided. The method includes the steps of: (a) transmitting a request for information from a requesting CPE on the upstream communication path, the request including a type of information; (b) based upon the type of information requested, routing the request to a selected ISPS coupled upstream and a selected ISPS coupled downstream; (c) receiving the requested information from the selected ISPS coupled upstream and the request for information from the selected ISPS coupled downstream on the downstream communication path at an associated one of a plurality of cable distribution devices, wherein the associated cable distribution device serves the requesting CPE; (d) wherein when the associated cable distribution device receives the request, routing the request to and receiving the requested information from the selected ISPS coupled downstream; (e) forming a composite signal which includes the requested information from the selected ISPS coupled upstream and the selected ISPS coupled downstream; and (f) distributing the composite signal on the cable transmission channels of the downstream path from the associated cable distribution device to the requesting CPE.

24 Claims, 8 Drawing Sheets

METHOD AND APPARATUS FOR INTEGRATING INTERACTIVE LOCAL INTERNET ACCESS AND DOWNSTREAM DATA TRANSFER OVER A CABLE TV SYSTEM WITH UPSTREAM DATA CARRIED BY OTHER MEDIA

FIELD OF THE INVENTION

This invention relates generally to data communication systems and, in particular, to systems for communicating broadcast data, video data and interactive data services to personal computing devices using high bandwidth channels available on a cable television infrastructure.

BACKGROUND OF THE INVENTION

The merger of computer and communications technology into an integrated information technology has lead to the development of broadcast and data communication systems which utilize communication satellites, antennas, transmitters and receivers, analog and digital networks, modems and fiber optic cables to relay information between computing devices, e.g., from an information service provider to a personal computing device. The information relayed by the broadcast and data communication systems includes a wide variety of data such as images, sound, text, voice, and/or video data. The information can also include digital, interactive data services provided by, for example, the internet.

In the following text the expression the "internet" refers to a computing infrastructure whose protocols and operating rules effectively permit the creation of a world-wide "network of networks." By connecting a personal computing device to the internet, digital, interactive data may be requested by and transmitted to the personal computing device from an interactive data service provider that is also connected to the internet. Thus, the internet permits the formation of a matrix of interconnected computing devices which have the ability to exchange information. The interactive data exchanged between the computing devices includes multimedia data in which high resolution graphics, video and sound are incorporated.

Typically, fiber optic cables, wires, switches, routers and other communications technologies have connected individual personal computing devices over a public switched telephone network (PSTN) to the internet. Generally, data transmission rates over the PSTN are relatively low speed. That is, data transmission rates are typically in a range below, for example, 50 kilobits per second. Performance in a multimedia-based, internet environment suffers due to the relatively low speed transmission rates of the PSTN.

Prior art solutions to improve transmission rates have included providing wide bandwidth, high-speed data transmissions found on, for example, a cable television infrastructure. In U.S. Pat. No. 5,534,913, issued Jul. 9, 1996, entitled "Apparatus and Method for Integrating Downstream Data Transfer Over a Cable Television Channel with Upstream Data Carrier by Other Media", by Majeti et al., a telecommunication network is disclosed that utilizes high-speed, cable transmission channels to transport information on a downstream channel from an information service provider to a user's customer premises equipment. Majeti et al. also disclose an infrastructure which simultaneously permits a lower speed upstream channel for transmitting user requests for information to an information service provider. In Majeti et al. high-speed cable transmission channels of about, for example, 6 megahertz are utilized to enable substantially higher transmission rates than would be possible over the PSTN. By utilizing the cable transmission channels for transmitting data from the information service provider to the user's customer premises equipment performance within the internet environment is said can be improved.

However, a need remains for a method and apparatus which employs the cable distribution network to provide high-speed data transmission rates while also allowing localized access to information service providers located on the downstream communication channel. By routing requests for information to information service providers coupled on the downstream communication channel a more cost effective architecture could be realized.

OBJECTS AND ADVANTAGES OF THE INVENTION

It is a first object and advantage of this invention to provide a telecommunication system that employs a cable distribution network to provide high-speed data transmission rates and which also allows localized access to information service providers located on a downstream communication channel.

It is another object and advantage of this invention to provide a telecommunication system that evaluates requests for information from a user's customer premise equipment (CPE) and, based upon a type of information requested, routes the request to an information service provider (ISP) coupled at one end of a upstream communication channel, or an information service provider coupled on a downstream communication channel.

It is a further object and advantage of this invention to provide a telecommunication system that evaluates requests for information from a user's customer premise equipment and, based upon whether video and broadcast data or interactive data services are requested, routes the request to one of a video and broadcast data service provider coupled at one end of an upstream communication channel or an interactive data service provider coupled on a downstream communication channel, and further distributes a composite signal which includes the requested video data, broadcast data and interactive services data to a requesting user using high-speed cable transmission channels.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention, wherein non-interactive data services, such as video data and/or broadcast data, and interactive data services are communicated from information service providers to computing devices using high bandwidth channels available on a cable infrastructure, such as a cable television infrastructure.

In accordance with the present invention, a method and apparatus for communicating between a plurality of information service provider systems (ISPS) and a plurality of customer premise equipment (CPE) is provided. The method uses cable transmission channels for transmitting information on a downstream communication path from the plurality of ISPS to the plurality of CPE. Separate transmission channels are used for transmitting requests for information on an upstream communication path from the plurality of CPE to the plurality of ISPS. In the method a plurality of ISPS are coupled at one end of the upstream communication path and a plurality of ISPS are coupled on the downstream communication path.

In accordance with the present invention, the method for communicating between the plurality of ISPS and the plurality of CPE includes the following steps: (a) transmitting a request for information from a requesting one of the plurality of CPE by using one of the separate transmission channels on the upstream communication path, the request including a type of information to be transmitted; (b) based upon the type of information requested, routing the request for information to one of a selected ISPS coupled upstream or a selected ISPS coupled downstream; (c) receiving the requested information from the one of the selected ISPS coupled upstream or the request for information from the selected ISPS coupled downstream on one of the cable transmission channels of the downstream communication path at an associated one of a plurality of cable distribution devices, wherein the associated cable distribution device serves the requesting CPE. Further in accordance with this invention, (d) when the associated cable distribution device receives the request for information, the method includes routing the request to and receiving the requested information from the selected ISPS coupled downstream; (e) forming a composite signal which includes the requested information from the selected ISPS coupled upstream and the selected ISPS coupled downstream; and (f) distributing the composite signal on one of the cable transmission channels of the downstream communication path from the associated cable distribution device to the requesting CPE.

In one embodiment requests for information from a requesting CPE are transmitted by a modem coupled to the public switched telephone network. In another embodiment the type of information requested by the requesting CPE includes a request for interactive data services, video data or broadcast data. Preferably, the request for interactive data services is a request for internet access and is routed to a selected one of the plurality of ISPS coupled on the downstream communication path.

The step of routing the request for information further includes the step of providing a controller for receiving the request for information and for evaluating the type of information requested. Preferably, when the request for information is comprised of a request for interactive data services, the request is routed to a selected ISPS coupled downstream.

The step of receiving the requested information and the request for information at the associated cable distribution device preferably includes the steps of: (a) providing a multiplexer having a first and a second input, the first input for receiving the requested information from the selected ISPS coupled upstream, and the second input for receiving the request for information from one of the plurality of ISPS coupled downstream; (b) multiplexing the first input and the second input of the multiplexer to provide a multiplexed signal; and (c) transmitting the multiplexed signal to the associated cable distribution device on one of the cable transmission channels of the downstream communication path.

In one embodiment, at the associated cable distribution device, the step of routing the request to and receiving the requested information from the selected ISPS coupled downstream includes the steps of: (a) providing the multiplexed signal at a local data service controller and at a data channel filter; (b) at the local data service controller, evaluating the multiplexed signal for the request for information from one of the plurality of ISPS coupled downstream, routing the request to a local data service provider coupled to the controller, and receiving the requested information from the local data service provider; and (c) at the data channel filter, filtering the multiplexed signal to remove the request for information from one of the plurality of ISPS coupled downstream and providing a data channel signal that is comprised of the requested information from the selected ISPS coupled upstream. Preferably, the local data service controller is comprised of a local interactive data service controller and the request for information from one of the plurality of ISPS coupled downstream is comprised of a request for interactive data services.

The step of forming the composite signal preferably includes the steps of: (a) providing a signal combiner having two inputs and an output; (b) at a first input of the signal combiner, receiving the requested data services from the local data service controller; (c) at a second input of the signal combiner, receiving the data channel from the data channel filter; and (d) combining the first input and the second input to form the composite at the output of the signal combiner. In one embodiment the composite signal which is distributed to the requesting CPE includes the requested data services from the local data service controller and the data channel signal from the data channel filter.

Further in accordance with this invention is a method for accessing information which includes the steps of (a) originating a request for a specific type of information and transmitting the request to a communications network; (b) for a first type of information request, fulfilling the request by routing the request to a first type of information provider and transmitting the requested information to a first input of a combiner via a receiver unit; (c) for a second type of information request, fulfilling the request by routing the request to a second type of information provider, via said receiver unit, and transmitting the requested information to a second input of said combiner; and (d) delivering the requested type or types of information from an output of said combiner to an appropriate destination device. The first type of information is comprised of non-interactive data, and the second type of information is comprised of interactive data. Preferably the second type of information provider is coupled to the internet. Also preferred is executing the step of delivering by transmitting the requested type or types of information to the appropriate destination device through a cable infrastructure, such as a cable television infrastructure.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
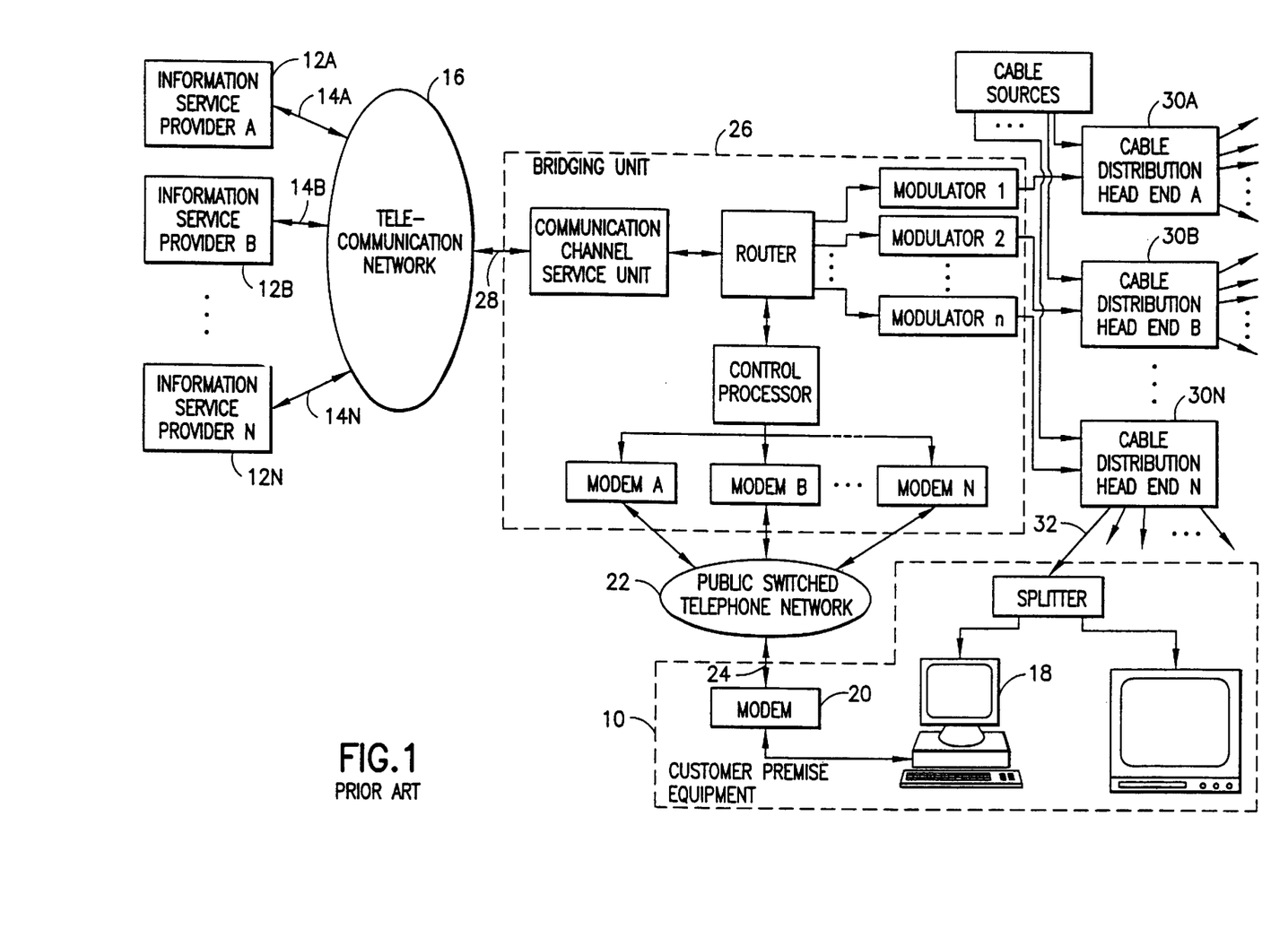
FIG. 1 is a block diagram of a conventional telecommunication system which uses a cable television infrastructure for communicating between customer premise equipment and information service providers.

FIG. 1 illustrates a conventional telecommunication system which uses a cable television infrastructure for communicating between a user's customer premise equipment 10 and information service providers 12A–12N. Generally, the information service providers 12A–12N communicate with the user's customer premise equipment 10 over high-speed communication channels 14A–14N of a telecommunication network 16.

Communication is initiated between the user's customer premise equipment 10 and one of the information service providers 12A–12N when the user makes a request for information. The user employs, for example, a personal computing device 18 of the user's customer premise equipment 10 to make the request for information. The personal computing device 18 includes a modem 20 which is coupled to a public switched telephone network (PSTN) 22 through a communication channel 24. The request is routed by a bridging unit 26 over a high-speed, bi-directional communication channel 28 and the telecommunication network 16 to a specified one of the information service providers 12A–12N.

In response to the request, the specified one of the information service providers 12A–12N transmits the requested information back through the telecommunication network 16 and the high-speed, bi-directional communication channel 28 to the bridging unit 26. The bridging unit 26 routes the requested information to one of a plurality of cable distribution head ends 30A–30N. One of the plurality of cable distribution head ends 30A–30N serves the requesting user's customer premise equipment 10. Therefore, the bridging unit 26 routes the requested information to the associated one of the plurality of cable distribution head ends 30A–30N. The associated one of the plurality of cable distribution head ends 30A–30N distributes the requested information to the requesting user's customer premise equipment 10 over cable communication channels 32.

In this way, the personal computing device 18 of the requesting user receives information over the cable television system at substantially higher transmission rates than would be realized if the information was transmitted over the relatively low-speed data channels of the PSTN 22, which uses dial-up modems.

It is noted that communication from a requesting user's customer premise equipment 10 to a specified one of the information service providers 12A–12N is referred to as communication along an upstream communication path. Accordingly, communication from the specified one of the information service providers 12A–12N to the requesting user's customer premise equipment 10 is referred to as communication along a downstream communication path.

Figure 2:
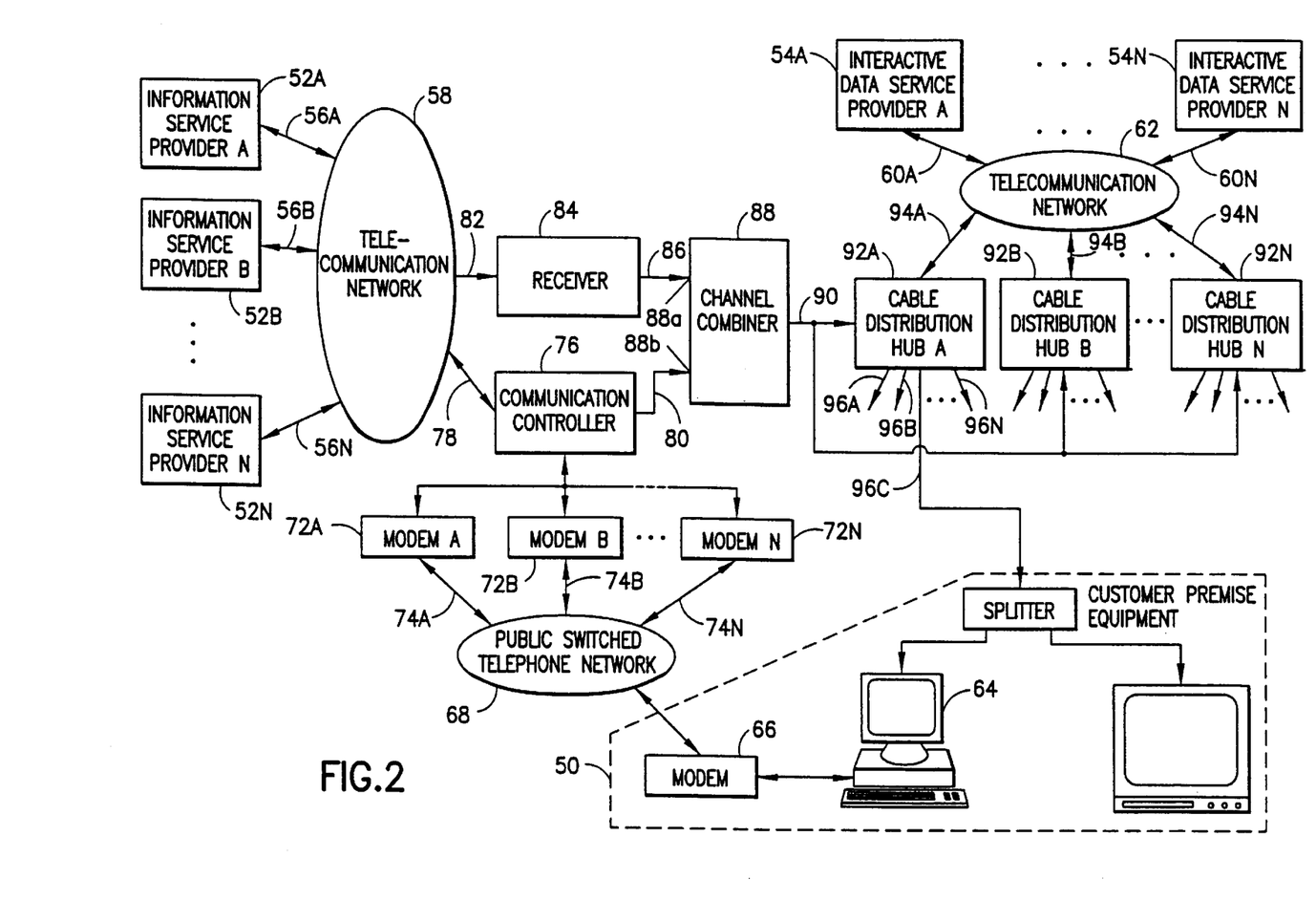
FIG. 2 is a block diagram of a telecommunication system which uses the cable television infrastructure and operates in accordance with the present invention.

In FIG. 2 a block diagram of a telecommunication system which operates in accordance with the present invention is shown. In a manner that may be similar to the telecommunication system illustrated in FIG. 1, the present invention may utilize a cable television infrastructure to communicate between information service providers and a user's customer premise equipment 50. In the present invention, however, information service providers are coupled at one end of an upstream communication path, e.g., information service providers 52A–52N, and on a downstream communication path, e.g., information service providers 54A–54N. Preferably, the information service providers 52A–52N coupled on the upstream communication path provide a first type of information, such as video data and broadcast data, while the information service providers 54A–54N coupled on the downstream communication path provide a second type of information, such as interactive data services. For example, the interactive data services include internet access.

A user requesting information services transmits a request for information from, for example, a personal computing device 64 of the user's customer premise equipment 50. The personal computing device 64 includes a modem 66 which is coupled to a public switched telephone network (PSTN) 68 through a communication channel 70. The request is received by one of a plurality of modems 72A–72N coupled to the PSTN 68 through a communication channel 74A–74N, respectively. Each of the plurality of modems 72A–72N is also coupled to a communication controller 76. The communication controller 76 evaluates the user's request for information. In accordance with the present invention the user's request for information includes a type of information requested. Preferably, the type of information requested includes a request for video data, broadcast data, or interactive data services. In other embodiments of this invention other types of data may be requested.

Based upon the type of information requested, the communication controller 76 routes the user's request for information to a selected one of the information services providers coupled at the end of the upstream communication path (one of the information service providers 52A–52N) or coupled on the downstream communication path (one of the interactive service providers 54A–54N). For example, if the user requests broadcast or video data then the communication controller 76 routes the request over communication channel 78 on the upstream communication path to one of the information service providers 52A–52N, i.e. the selected one of the information service providers 52A–52N as specified within the user's request for information. If the user requests interactive data services, e.g. internet access, then the communication controller 76 routes the request over communication channel 80 on the downstream communication path toward one of the interactive data service providers 54A–54N. As shown in FIG. 2, however, the request for interactive data services is not processed directly by one of the downstream interactive service providers 54A–54N. The downstream processing is discussed in detail below.

As noted above, the request for information from the selected one of the information services providers coupled at the end of the upstream communication path (one of the information service providers 52A–52N) is routed over communication channel 78. From communication channel 78 the request is communicated over the telecommunication network 58 to the selected information service provider coupled to an associated one of the communication channels 56A–56N. In response to the request, the selected one of the information service providers 52A–52N transmits the requested information over the downstream communication path from the associated communication channels 56A–56N, through the telecommunication network 58, and over a high-speed communication channel 82 to a receiver 84. For example, the selected one of the information service providers 52A–52N transmits the requested video data or broadcast data back through the downstream communication path to the receiver 84.

In accordance with the present invention, the requested information received from the selected one of the information service providers 52A–52N (e.g., the video data and broadcast data) is passed by the receiver 84 over communication channel 86 to a first input 88a of a multiplexer/channel combiner 88. Similarly, the request for interactive data services is passed by the communication controller 76 over communication channel 80 to a second input 88b of the multiplexer/channel combiner 88. The first input and the second input are multiplexed by the multiplexer/channel combiner 88 to provide a multiplexed signal which includes the requested information received from the selected one of the information service providers 52A–52N and the request for interactive data services from the communication controller 76. The multiplexed signal is outputted by the multiplexer/channel combiner 88 and transmitted on one of the cable transmission channels, e.g. cable transmission channel 90, of the downstream communication path to one of a plurality of cable distribution devices 92A–92N.

It can be appreciated that one of the plurality of cable distribution devices 92A–92N serves one of the plurality of user's customer premise equipment 50. In particular, an associated one of the plurality of cable distribution devices 92A–92N serves the requesting user's customer premise equipment 50. Therefore and as shown in FIG. 2, the associated cable distribution device, e.g. a cable distribution hub A 92A, receives the transmitted multiplexed signal over cable transmission channel 90 from the multiplexer/channel combiner 88.

Figure 3:
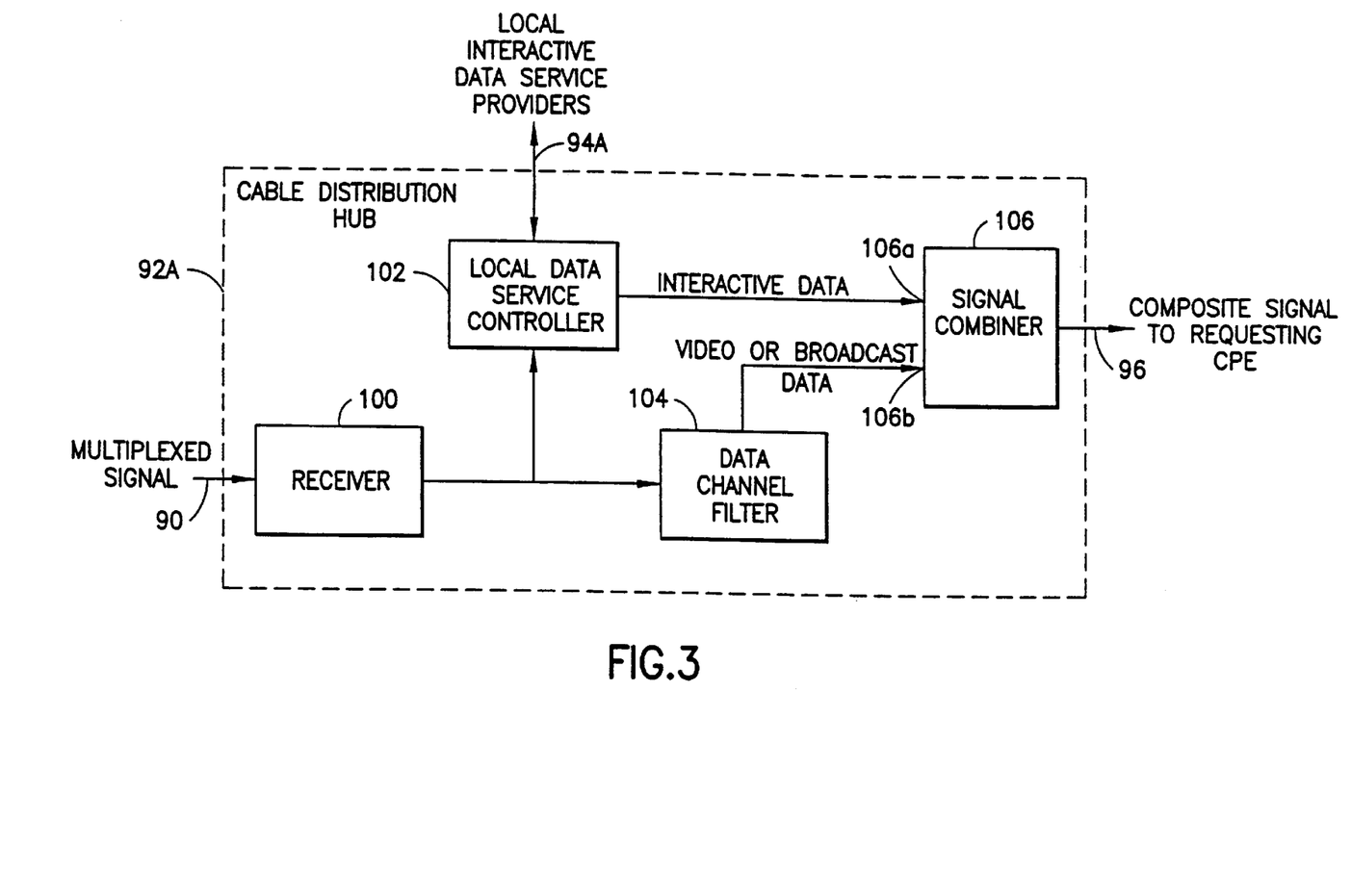
FIG. 3 is a block diagram of a cable distribution device of the telecommunication system of FIG. 2.

With reference to FIGS. 2 and 3, the processing of the received, multiplexed signal at the associated cable distribution device, i.e. the cable distribution hub A 92A, is now described. The multiplexed signal is received at a receiver 100 of the cable distribution hub A 92A over the cable transmission channel 90. The receiver 100 passes the multiplexed signal to a local data service controller 102 and to a data channel filter 104, both of which may be included within the cable distribution hub A 92A. Preferably, the local data service controller 102 is a local interactive data service controller, for example a local internet access controller.

The local data service controller 102 is coupled to a plurality of local information service providers through a bi-directional, high-speed communication channel 94A and a telecommunication network 62. Preferably, the local data service controller 102 of the cable distribution hub A 92A is coupled to the plurality of interactive data service providers 54A–54N. It can be appreciated that a local data service controller of each of the plurality of cable distribution devices 92A–92N is coupled to the plurality of local information service providers, i.e. the plurality of interactive data service providers 54A–54N, through a corresponding one of a plurality of bi-directional, high-speed communication channels 94A–94N, the telecommunication network 62 and a plurality of bi-directional, high-speed communication channels 60A–60N.

At the cable distribution hub A 92A, the local data service controller 102 evaluates the multiplexed signal to determine if it contains a request for information from one of the plurality of interactive service providers 54A–54N. If the multiplexed signal contains the request for information from one of the plurality of interactive service providers 54A–54N, the local data service controller 102 routes the request to a selected local data service providers coupled to the controller. That is, the local data service controller 102 passes the request over the high-speed communication channel 94A through the telecommunication network 62 and over one of the plurality of bi-directional, high-speed communication channels 60A–60N to the selected one of the interactive data service providers 54A–54N. The selected one of the interactive data service providers 54A–54N processes the request for information and transmits the requested information back over the one of the plurality of bi-directional, high-speed communication channels 60A–60N, through the telecommunication network 62 and over the bi-directional, high-speed communication channel 94A to the local data service controller 102. For example, the interactive data service provider 54A transmits the requested interactive data services back over the bi-directional, high-speed communication channel 60A, through the telecommunication network 62 and over the high-speed communication channel 94A to the local data service controller 102.

As noted above, the data channel filter 104 also receives the multiplexed signal from the receiver 100. The data channel filter 104 filters the multiplexed signal to remove the request for information from one of the plurality of information service providers coupled on the downstream communication path, i.e. one of the plurality of interactive service providers 54A–54N. As a result, the data channel filter 104, at an output, provides a data channel signal in which the request for information is removed from the multiplexed signal. Therefore, the data channel signal includes the requested information which was provided from the selected information service provider coupled at the end of the upstream communication channel.

In accordance with an aspect of this invention, and referring to FIG. 3, the requested interactive data services are transmitted by the local data service controller 102 to a first input 106a of a signal combiner 106. Similarly, the requested information received from the selected information service provider coupled at the end of the upstream communication channel, is passed by the data channel filter 104 to a second input 106b of the signal combiner 106. The signal combiner 106 combines the first and the second inputs to form a composite signal which therefore includes the requested video data and broadcast data transmitted by the specified one of the information service providers 52A–52N and the requested interactive data services transmitted by the specified one of the interactive service providers 54A–54N.

As was noted above and as shown in FIG. 2, an associated one of the plurality of cable distribution devices 92A–92N, i.e. cable distribution hub A 92A, serves the requesting user's customer premise equipment 50. Thus, the cable distribution hub A 92A distributes the composite signal over one of a plurality of cable transmission channels 96A–96N, e.g. cable transmission channels 96C, of the downstream communication path to the requesting user's customer premise equipment 50. These signals are sent through a coaxial cable directly into a subscriber's premises. As a result, the personal computing device 64 of the requesting user's customer premise equipment 50 receives the requested information by utilizing the cable television infrastructure.

Figure 4A:
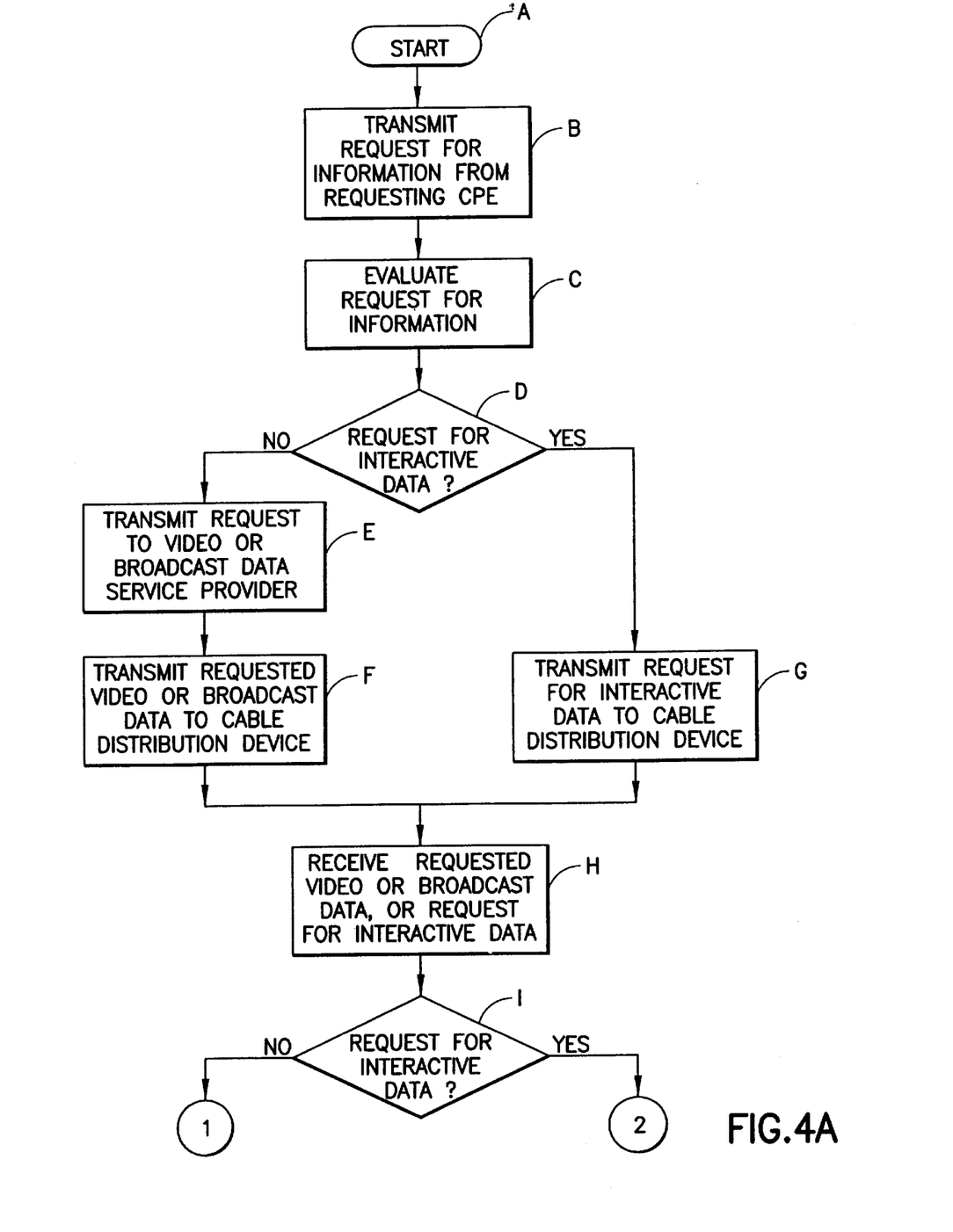
FIGS. 4A and 4B are flow charts that illustrates a method of the present invention.
Figure 4B:
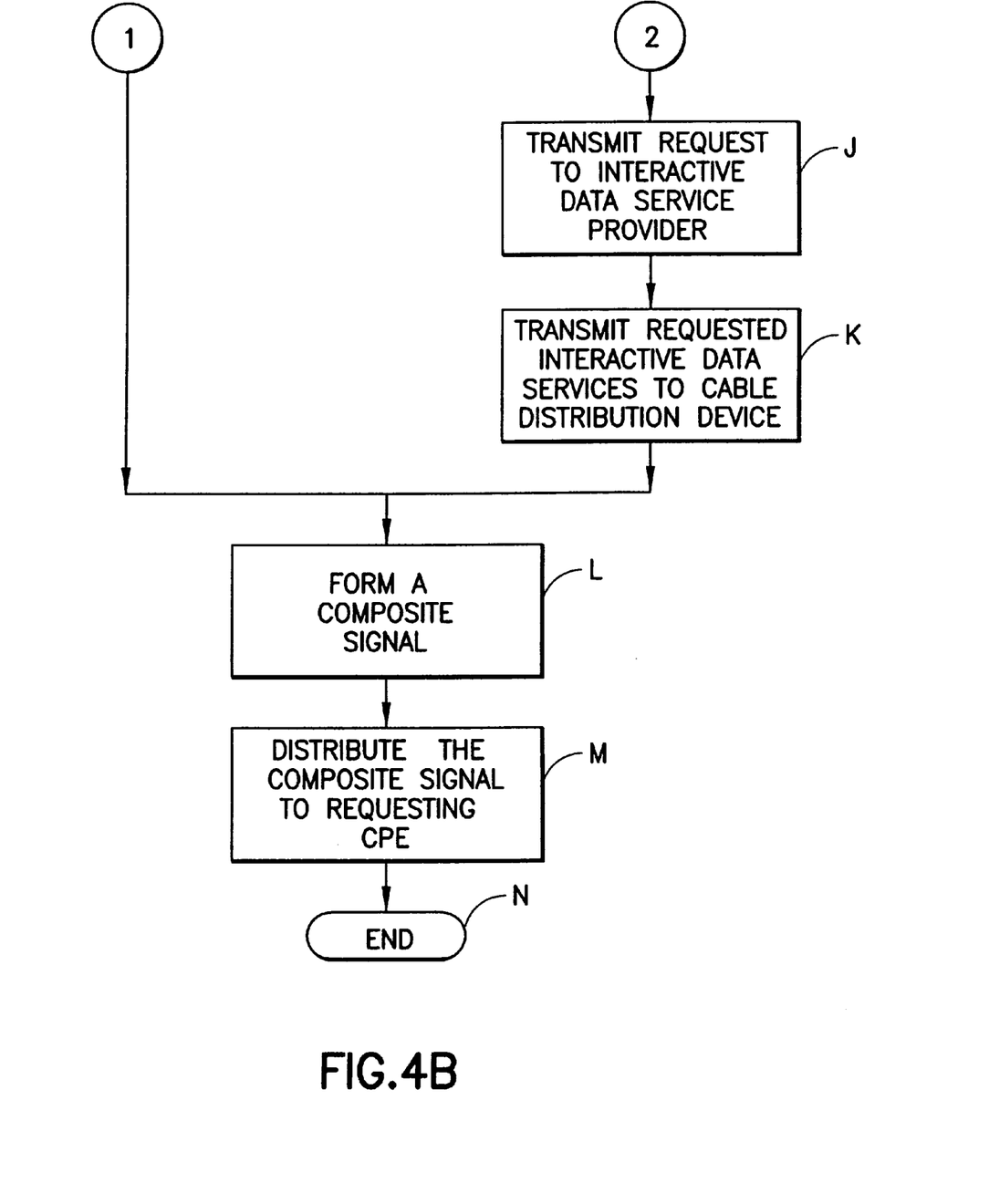

In FIGS. 4A and 4B a method for communicating between a requesting one of the plurality of customer premise equipment (CPE) and a selected one of the plurality of information service providers 52A–52N and 54A–54N is illustrated. The method begins at Block A and passes control to Block B where a request for information from the selected one of the plurality of information service providers is transmitted from the requesting CPE. Preferably, the request for information is a request for video data, broadcast data, or interactive data from the selected information service provider, but is not limited for use with only these three types of information. At Block C the request is evaluated by, for example, a controller. Specifically, the request is evaluated to determine the type of information requested by the requesting CPE, i.e. whether video data, broadcast data, or interactive data is requested. A decision is made at Block D based upon the type of information requested. If, for example, video or broadcast data is requested, i.e. interactive data is not requested, control passes to Block E (a "NO" path from Block D). At Block E, the request is transmitted to a selected video or broadcast data service provider. That is, the selected information service provider specified by the request for information from the requesting CPE. The selected video or broadcast data service provider processes the request and at Block F transmits the requested video or broadcast data to, for example, an associated one of a plurality of cable distribution devices. The associated cable distribution device serves the requesting CPE. If, at Block D, the request transmitted by the requesting CPE is for interactive data, then control passes from Block D to Block G (a "YES" path from Block D). At Block G, the request for interactive data is transmitted to the associated cable distribution device which serves the requesting CPE. It is particularly instructive to note that, at Block G, the request for interactive data, and not the interactive data itself, is transmitted to the associated cable distribution device.

At Block H, the associated cable distribution device receives the requested information from the selected video or broadcast data service provider and the request for interactive data. At the cable distribution device, i.e. at Block I, the content of the received data is evaluated to determine if a request for interactive data was received. If the request for interactive data is present at Block I, then control passes to Block J (a "YES" path from Block I). The "YES" path follows a connector labelled by an encircled 2 from FIG. 4A to FIG. 4B. At Block J, the request for interactive data is transmitted to a selected interactive service provider. The selected interactive service provider processes the request and, at Block K, transmits the requested interactive data service back to the cable distribution device which serves the requesting CPE. Preferably, but not necessarily, the selected interactive service provider is a local internet access provider. Once the interactive data services are transmitted control passes from Block K to Block L. If, at Block I, the requested video or broadcast data is received, then control passes directly from Block I to Block L along a "NO" path. The "NO" path follows a connector labelled by an encircled 1 from FIG. 4A to FIG. 4B. At Block L the requested video or broadcast data and the requested interactive data services are combined by the associated cable distribution device to form a composite signal. Once the composite signal is formed control passes from Block L to Block M. At Block M, the associated cable distribution device distributes the composite signal to the requesting CPE. Thus, the requesting CPE receives the video or broadcast data, or interactive data services that it requested at Block B. The method completes at Block N.

Figures 5A, 5A:
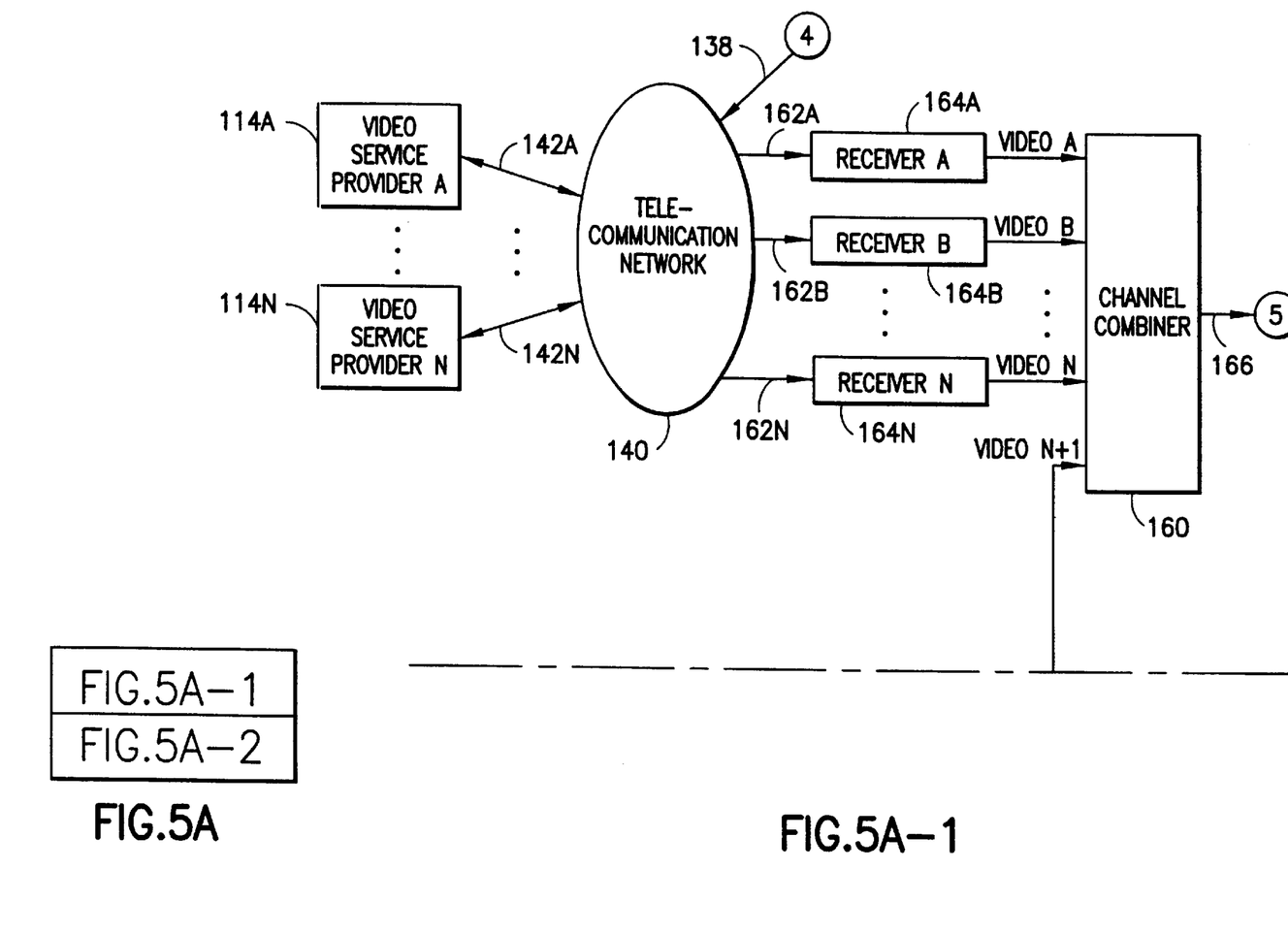
FIGS. 5A and 5B are block diagrams of a preferred embodiment of the telecommunication system of the present invention.
Figure 5A:
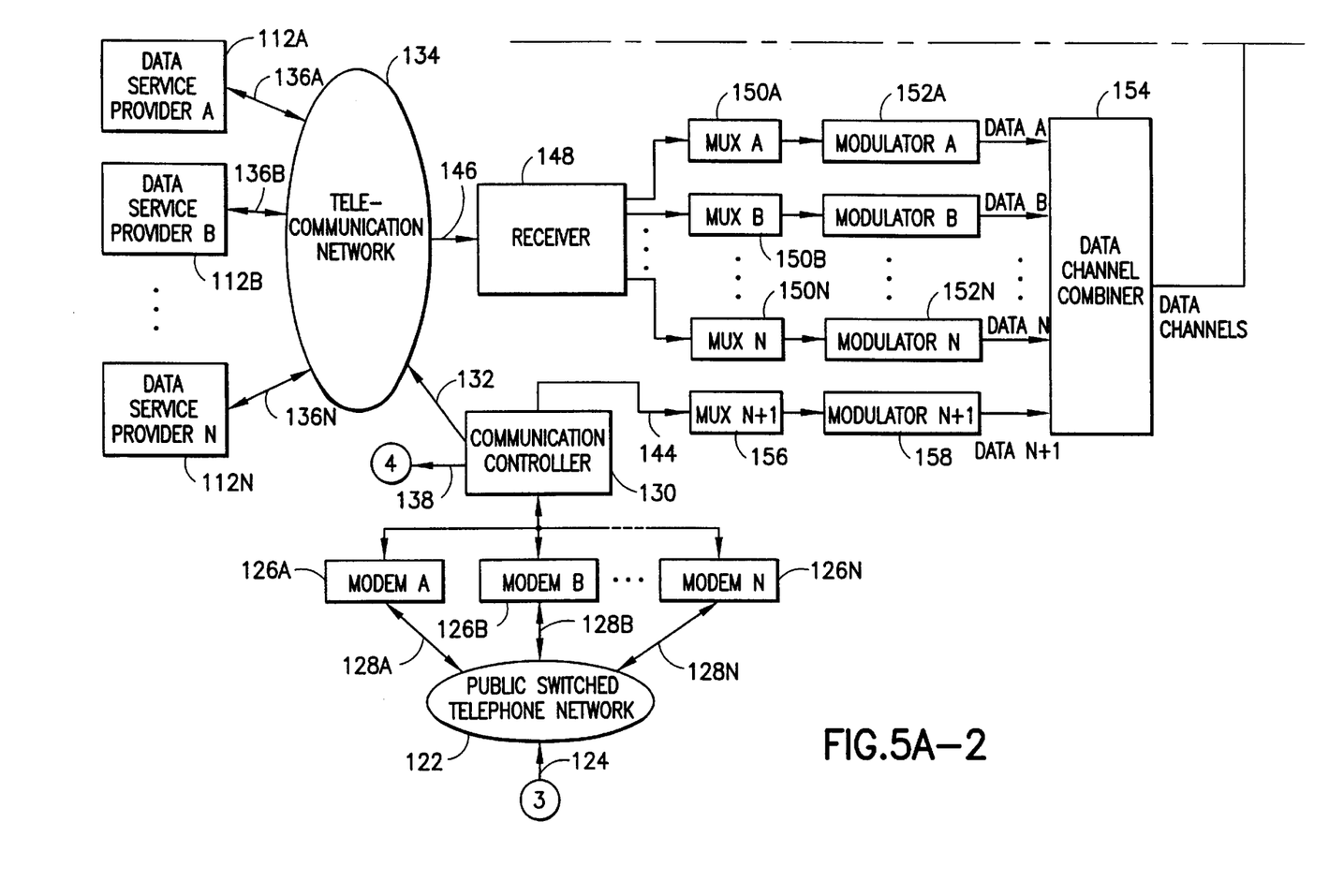
Figure 5B:
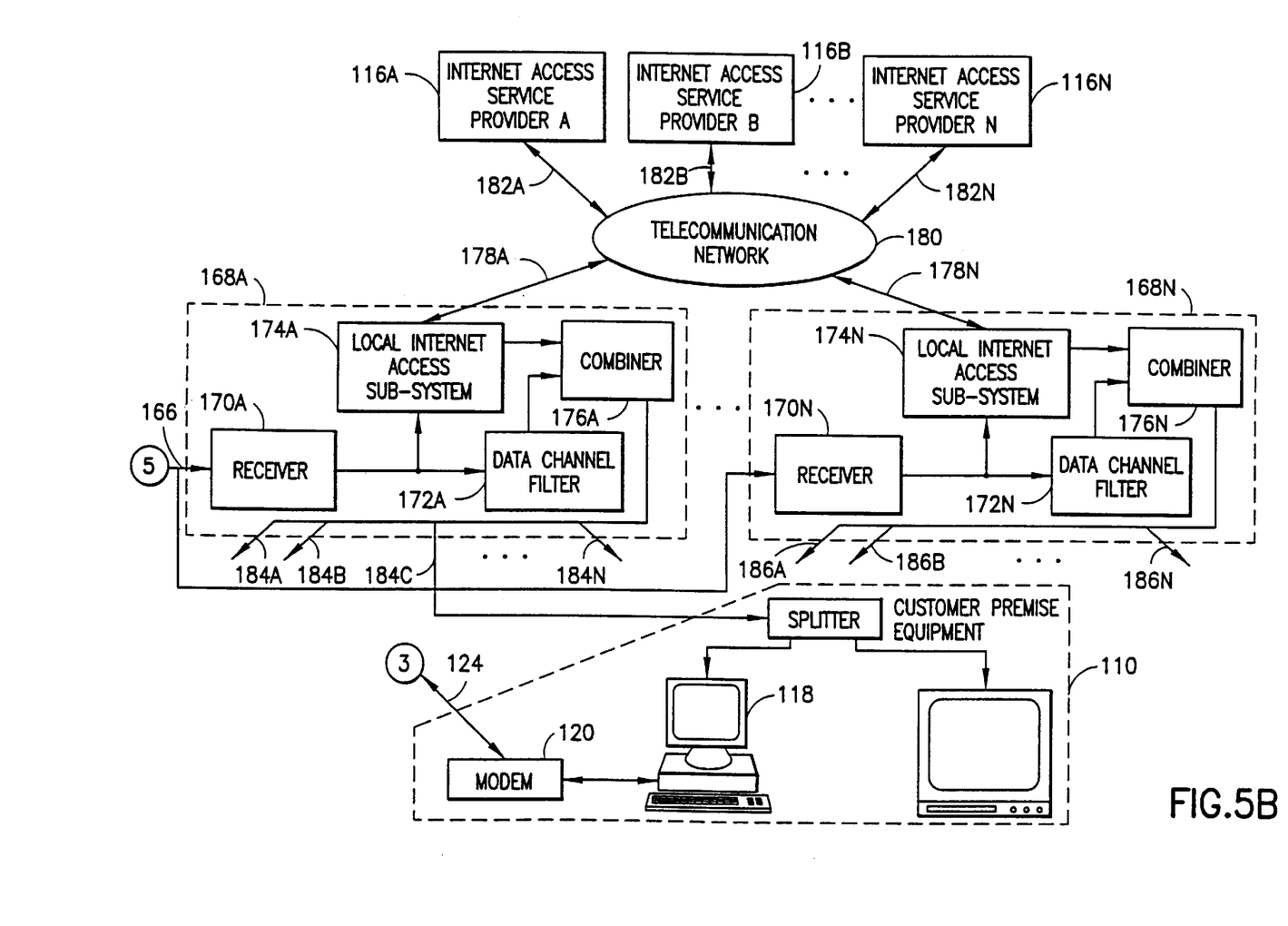

FIGS. 5A and 5B are block diagrams of a preferred embodiment of a telecommunication system which operates in accordance with the present invention. As shown in FIGS. 5A and 5B, the present invention utilizes a cable-based infrastructure, typically a cable television infrastructure, to communicate between a plurality of information service providers and a user's customer premise equipment 110. In the preferred embodiment, the information service providers include broadcast data service providers 112A–112N, video data service providers 114A–114N and internet access service providers 116A–116N. In FIGS. 5A and 5B the broadcast data service providers 112A–112N and video data service providers 114A–114N are coupled at one end of an upstream communication path (i.e. a communication path from the user's customer premise equipment 110 to the broadcast data and video data service providers), while the internet access service providers 116A–116N are coupled on a downstream communication path (i.e. a communication path from a communication controller 130 to the user's customer premise equipment 110). The upstream and downstream communication paths are discussed in greater detail below.

In the preferred embodiment, as in the telecommunication system illustrated in FIG. 2, a user requesting information services transmits a request for information over the upstream communication path from a personal computing device 118 of the user's customer premise equipment 110. The personal computing device 118 includes a modem 120 which is coupled to a public switched telephone network (PSTN) 122 through a low-speed communication channel 124. As shown, the low-speed communication channel 124 passes the user's request for information from the modem 120 through a connector labelled by an encircled 3 from FIG. 5B to the PSTN 122 shown in FIG. 5A.

The user's request for information is received by one of a plurality of modems 126A–126N coupled to the PSTN 122 through a low-speed communication channel 128A–128N, respectively. Each of the plurality of modems 126A–126N is also coupled to the communication controller 130. The receiving one of the plurality of modems 126A–126N passes the user's request for information to the communication controller 130. The communication controller 130 evaluates the user's request for information to determine if the request includes a request for information from a selected one of the broadcast data service providers 112A–112N, the video data service providers 114A–114N or the internet access service providers 116A–116N.

If the communication controller 130 determines that the request includes the request for information from a selected one of the broadcast data service providers 112A–112N, then the communication controller 130 routes the user's request to the selected one of broadcast data service providers 112A–112N specified by the request over the upstream communication path. That is, the communication controller 130 routes the request over a low-speed communication channel 132, through a telecommunication network 134 and over one of a plurality of bi-directional, high-speed communication channels 136A–136N to the specified broadcast data service provider, for example, over communication channel 136A to broadcast data service provider 112A.

Similarly, if the communication controller 130 determines that the request includes the request for information from a selected one of the video data service providers 114A–114N, then the communication controller 130 routes the user's request to the selected one of the video data service providers 114A–114N specified by the request over the upstream communication path. For example, the communication controller 130 routes the request over a low-speed communication channel 138, through a telecommunication network 140 and over one of a plurality of bi-directional, high-speed communication channels 142A–142N to the selected one of the plurality of video data service providers 114A–114N.

If the communication controller 130 determines that the request includes the request for information from a selected one of the internet access service providers 116A–116N, then the communication controller 130 routes the user's request to the selected one of internet access service providers 116A–116N specified by the request over a communication channel 144 of the downstream communication path. The downstream processing of the request for information from the selected one of the internet access service providers 116A–116N is discussed in detail below.

Reference is again made to the request for information from the selected one of the plurality of broadcast data service providers 112A–112N. In response to the request for information, the selected one of the broadcast data service providers 112A–112N transmits the requested broadcast data over the downstream communication path. That is, the selected one of the broadcast data service providers 112A–112N transmits the broadcast data over an associated one of the bi-directional, communication channels 136A–136N, through the telecommunication network 134, and over a high-speed communication channel 146 to a receiver 148.

In the preferred embodiment, the requested information received from the selected one of the broadcast data service providers 112A–112N is passed by the receiver 148 through one of a plurality of multiplexers 150A–150N and one of a plurality of modulators 152A–152N to one of A–N inputs of a data channel combiner 154. In addition to receiving the requested information received from the selected one of the broadcast data service providers 112A–112N, the data channel combiner 154 receives, at an N+1 input, the request for internet access data services. The request for internet access data services is passed by the communication controller 130 over the communication channel 144 through a multiplexer 156 and a modulator 158.

The A to N+1 inputs of the data channel combiner 154 are multiplexed to provide a first multiplexed data channel signal which includes the requested information received from the selected one of the broadcast data service providers 112A–112N and the request for internet access services from the communication controller 130. The first multiplexed data channel signal is outputted by the data channel combiner 154 and is received by a channel combiner 160 at an N+1 input.

Reference is now made to the request for information from the selected one of the plurality of video data service providers 114A–114N. In response to the request for information, the selected one of the video data service providers 114A–114N processes the request and transmits the requested information over the downstream communication path. That is, the selected one of the video data service providers 114A–114N transmits the information over an associated one of the bi-directional, communication channels 142A–142N, through the telecommunication network 140, and over one of a plurality of a high-speed communication channels 162A–162N to one of a plurality of receivers 164A–164N. For example, if the selected one of the video data service providers 114A–114N is video data service provider 164A, then provider 164A processes the request and transmits the requested video data over the bi-directional, communication channel 142A, through the telecommunication network 140, and over one of the high-speed communication channel 162A to the receiver 164A.

The receiving one of the plurality of receivers 164A–164N passes the requested video data received from the selected one of the video data service providers 114A–114N to one of A–N inputs of the channel combiner 160. Thus, the channel combiner 160 receives the requested video data at one of the A–N inputs and the first multiplexed data channel signal from the data channel combiner 154 at the N+1 input. The channel combiner 160 combines the A–N+1 inputs to provide a second multiplexed data channel signal which includes the requested information received from the selected one of the broadcast data service providers 112A–112N, the requested information received from the selected one of the video data service providers 114A–114N and the request for internet access services from the communication controller 130. The second multiplexed data channel signal is outputted by the channel combiner 160 and transmitted on one of the cable transmission channels, e.g. cable transmission channel 166, of the downstream communication path to one of a plurality of cable distribution devices 168A–168N.

It can be appreciated that one of the plurality of cable distribution devices 168A–168N serves one of the plurality of user's customer premise equipment 110. In particular, one of the plurality of cable distribution devices 168A–168N serves the requesting user's customer premise equipment 110. Therefore, and as is shown in FIG. 5B, the associated cable distribution device, i.e. the cable distribution hub 168A, receives the transmitted second multiplexed signal over cable transmission channel 166 from the channel combiner 160. Also, each of the plurality of cable distribution devices 168A–168N preferably includes one of a plurality of receivers 170A–170N, one of a plurality of data channel filters 172A–172N, one of a plurality of local internet access sub-systems 174A–174N and one of a plurality of combiners 176A–176N. Each of the plurality of receives 170A–170N is coupled to one of the cable transmission channels, e.g. the cable transmission channel 166, of the downstream communication path for receiving the second multiplexed signal from the channel combiner 160.

At the associated cable distribution device, i.e. the cable distribution hub 168A, the second multiplexed signal is received at the receiver 170A. The receiver 170A passes the multiplexed signal to a local internet access sub-system 174A and to a data channel filter 172A, both included within the cable distribution hub 168A. The local internet access sub-system 174A, as with each of the plurality of local internet access sub-systems 174A–174N, is coupled to the plurality of local internet access service providers 116A–116N through one of a plurality of high-speed, bi-directional communication channels 178A–178N, a telecommunication network 180 and one of a plurality of bi-directional, high-speed communication channels 182A–182N. It can be appreciated that each of the local internet access sub-systems 174A–174N of each of the plurality of cable distribution devices 168A–168N is coupled to the plurality of local internet access service providers 116A–116N, through a corresponding one of the plurality of the high-speed, bi-directional communication channels 178A–178N, the telecommunication network 180 and one of the plurality of high-speed, bi-directional communication channels 182A–182N.

Processing of the received second multiplexed signal at an exemplary one of the plurality of cable distribution devices 168A–168N, e.g. cable distribution device 168A, proceeds as follows. Since the receiver 170A provides the second multiplexed signal to the local internet access sub-system 174A and the data channel filter 172A each acts upon the signal. The local internet access sub-system 174A evaluates the second multiplexed signal to determine if it contains a request for information from one of the plurality of internet access service providers 116A–116N. If the second multiplexed signal contains the request for information from one of the plurality of internet access service providers 116A–116N, the local internet access sub-system 174A routes the request to a selected one of the plurality of local internet access service providers 116A–116N as specified by the request for internet access within the second multiplexed signal. That is, the local internet access sub-system 174A passes the request over the high-speed communication channel 178A, through the telecommunication network 180 and over one of the high-speed communication channels 182A–182N to the selected one of the internet access service providers 116A–116N. The selected one of the internet access service providers 116A–116N processes the request for information and transmits the requested internet access services back over the corresponding one of the high-speed communication channels 182A–182N, through the telecommunication network 180 and over the high-speed communication channel 178A to the local internet access sub-system 174A.

As noted above, the data channel filter 172A also receives the second multiplexed signal from the receiver 170A. The data channel filter 172A filters the second multiplexed signal to remove the request for information from one of the plurality of local internet access service providers 116A–116N coupled on the downstream communication path. As a result, the data channel filter 172A provides a data channel signal in which the request for information is removed from the second multiplexed signal. Therefore, the data channel signal includes the requested information received from the selected one of the broadcast data service providers 112A–112N and the requested information received from the selected one of the video data service providers 114A–114N.

In accordance with the present invention, the requested internet access services are transmitted by the local internet access sub-system 174A to a first input of the combiner 176A. Similarly, the data channel signal is passed by the data channel filter 172A to a second input of the combiner 176A. The combiner 176A combines the first and the second inputs to form a composite signal. The composite signal therefore includes the requested information received from the selected one of the broadcast data service providers 112A–112N, the requested information received from the selected one of the video data service providers 114A–114N and the requested internet access services received from the selected one of the internet access service providers 116A–116N.

As was noted above and as shown in FIG. 5B, one of the plurality of cable distribution devices 168A–168N, i.e. the cable distribution hub 168A, serves the requesting user's customer premise equipment 110. Thus, the cable distribution hub 168A distributes the composite signal outputted by the combiner 176A over a cable transmission channel of the downstream communication path to the requesting user's customer premise equipment 110. For example and as shown in FIG. 5B, a plurality of cable transmission channels 184A–184N couples cable distribution hub 168A to one of a plurality of customer premise equipment, while a plurality of cable transmission channels 186A–186N couples cable distribution hub 168N to one of a plurality of customer premise equipment. Thus, one of the plurality of cable transmission channels 184A–184N, e.g. channel 184C, distributes the composite signal to the requesting user's customer premise equipment 110. As a result, the personal computing device 118 of the requesting user's customer premise equipment 110 receives the requested information by utilizing the cable television infrastructure.

While described above in the context of a system having both broadcast data service providers and video data service providers, it should be realized that in some embodiments only one type of service provider may be present, while in others there may be also a third type of service provider (or more.) As such, and as was noted above, the teachings of this invention are not to be construed to be limited to only the disclosed requests for video data, broadcast data (more generally non-interactive data) and interactive data. The specific systems and components disclosed in FIGS. 2, 3, 5A and 5B should also not be viewed in a limiting sense upon the practice of this invention, but should instead be viewed as being exemplary of presently preferred embodiments. Those skilled in the art may devise other arrangements of the disclosed components, and/or may substitute certain components for other components, and/or may vary the numbers of components, and/or may change the connections between certain components, and all such modifications will fall within the ambit of the teachings of this invention. For example, certain of the broadcast information signals (video and/or data) could be received from satellites, while certain of the terrestrial data paths could be conveyed through fiber optic cables. The method disclosed in FIGS. 4A and 4B should be viewed in a similar manner, i.e., as being exemplary of the teachings of this invention, and not as restricting the scope of these teachings.

Thus, and although described in the context of preferred embodiments, it should be realized that a number of modifications to these teachings may occur to one skilled in the art, and while the invention has been particularly shown and described with respect to preferred embodiments thereof, those skilled in the art should appreciate that changes in form and details may be made therein without departing from the scope and spirit of the invention.

What is claimed is:

1. A method for communicating between a plurality of information service provider systems (ISPS) and a plurality of customer premise equipment (CPE) by using transmission channels for transmitting information on a downstream communication path from the plurality of ISPS to the plurality of CPE and transmission channels for transmitting requests for information on an upstream communication path from the plurality of CPE to the plurality of ISPS, the method comprising the steps of:

providing a plurality of ISPS coupled at one end of the upstream communication path and a plurality of ISPS coupled on the downstream communication path;

transmitting a request for information from a requesting one of the plurality of CPE by using one of the transmission channels on the upstream communication path, the request including a type of information to be transmitted;

based upon the type of information requested, routing the request for information to one of a selected ISPS coupled upstream or a selected ISPS coupled downstream;

receiving the requested information from the one of the selected ISPS coupled upstream or the request for information from the selected ISPS coupled downstream on one of the transmission channels of the downstream communication path at an associated one of a plurality of distribution devices, wherein the associated distribution device serves the requesting CPE;

wherein when the associated distribution device receives the request for information, routing the request to and receiving the requested information from the selected ISPS coupled downstream;

forming a composite signal which includes the requested information from the selected ISPS coupled upstream and from the selected ISPS coupled downstream; and distributing the composite signal on one of the transmission channels of the downstream communication path from the associated distribution device to the requesting CPE.

2. A method for communicating between a plurality of ISPS and a plurality of CPE as set forth in claim 1, wherein the step of transmitting the request for information from the requesting CPE further comprising the step of transmitting the request by a modem coupled to a public switched telephone network.

3. A method for communicating between a plurality of ISPS and a plurality of CPE as set forth in claim 1, wherein the type of request for information is comprised of a request for one of interactive data services, video data and broadcast data.

4. A method for communicating between a plurality of ISPS and a plurality of CPE as set forth in claim 3, wherein the request for interactive data services is comprised of a request for internet access.

5. A method for communicating between a plurality of ISPS and a plurality of CPE as set forth in claim 1, wherein the step of routing the request for information further comprising the steps of:
providing a controller for receiving the request for information and for evaluating the type of information requested; and
wherein when the request for information is comprised of a request for interactive data services, routing the request to the selected ISPS coupled downstream.

6. A method for communicating between a plurality of ISPS and a plurality of CPE as set forth in claim 1, wherein the step of receiving the requested information and the request for information at the associated distribution device further comprising the steps of:
providing a multiplexer having a first and a second input, the first input for receiving the requested information from the selected ISPS coupled upstream, and the second input for receiving the request for information from one of the plurality of ISPS coupled downstream;
multiplexing the first input and the second input of the multiplexer to provide a multiplexed signal; and
transmitting the multiplexed signal to the associated cable distribution device on one of the transmission channels of the downstream communication path.

7. A method for communicating between a plurality of ISPS and a plurality of CPE as set forth in claim 6, wherein the step of routing the request to and receiving the requested information from the selected ISPS coupled downstream further comprising the steps of:
providing the multiplexed signal at a local data service controller and at a data channel filter;
at the local data service controller, evaluating the multiplexed signal for the request for information from one of the plurality of ISPS coupled downstream, routing the request to a local data service provider coupled to the controller, and receiving the requested information from the local data service provider; and
at the data channel filter, filtering the multiplexed signal to remove the request for information from one of the plurality of ISPS coupled downstream and providing a data channel signal that is comprised of the requested information from the selected ISPS coupled upstream.

8. A method for communicating between a plurality of ISPS and a plurality of CPE as set forth in claim 7, wherein the local data service controller is comprised of a local interactive data service controller and the request for information from one of the plurality of ISPS coupled downstream is comprised of a request for interactive data services.

9. A method for communicating between a plurality of ISPS and a plurality of CPE as set forth in claim 7, wherein the step of forming the composite signal further comprising the steps:

providing a signal combiner having two inputs and an output;
at a first input of the signal combiner, receiving the requested data services from the local data service controller;
at a second input of the signal combiner, receiving the data channel signal from the data channel filter; and
combining the first input and the second input to form the composite signal at the output of the signal combiner.

10. A method for communicating between a plurality of information service provider systems (ISPS) and a plurality of customer premise equipment (CPE) by using cable transmission channels for transmitting information on a downstream communication path from the plurality of ISPS to the plurality of CPE and separate transmission channels for transmitting requests for information on an upstream communication path from the plurality of CPE to the plurality of ISPS, the method comprising the steps of:
providing a plurality of ISPS coupled at one end of the upstream communication path and a plurality of ISPS coupled on the downstream communication path;
transmitting a request for information from a requesting one of the plurality of CPE by using a modem coupled to the requesting CPE and to a public switched telephone network, the public switched telephone network providing the separate transmission channels of the upstream communication path, wherein the request for information includes a request for at least one of interactive data services, video data and broadcast data to be transmitted;
wherein when the request for information is comprised of one of the request for video data or broadcast data, routing the request to one of the plurality of ISPS coupled upstream;
receiving the requested video data and broadcast data on one of the cable transmission channels of the downstream communication path from the selected ISPS coupled upstream;
wherein when the request for information is comprised of one of the request for interactive data services, routing the request to one of the plurality of ISPS coupled downstream;
forming a multiplexed signal which comprises the requested video data and broadcast data received from the selected ISPS coupled upstream and the request for interactive data services from one of the plurality of ISPS coupled downstream;
transmitting the multiplexed signal on one of the cable transmission channels of the downstream communication path to one of a plurality of cable distribution devices, wherein an associated one of the plurality of cable distribution devices serves the requesting CPE;
receiving the multiplexed signal at the associated cable distribution device, the associated cable distribution device having a local data service controller and a data channel filter;
providing the received multiplexed signal to the local data service controller and to the data channel filter;
at the local data service controller, wherein when the multiplexed signal comprises the request for interactive data services, routing the request to a selected one of a plurality of ISPS coupled to the local data service controller, and receiving the requested interactive data services from the selected ISPS coupled to the controller;

at the data channel filter, filtering the multiplexed signal to remove the request for interactive data services and providing a data channel signal that is comprised of the requested video data and broadcast data;

combining the requested interactive data services and the data channel signal to form a composite signal; and distributing the composite signal on one of the cable transmission channels of the downstream communication path from the associated cable distribution device to the requesting CPE.

11. A telecommunication system for communicating between a plurality of information service provider systems (ISPS) and a plurality of customer premise equipment (CPE), said telecommunication system using cable transmission channels for transmitting information on a downstream communication path from said plurality of ISPS to said plurality of CPE and separate transmission channels for transmitting requests for information on an upstream communication path from said plurality of CPE to said plurality of ISPS, said telecommunication system comprising a plurality of ISPS coupled at one end of said upstream communication path and a plurality of ISPS coupled on said downstream communication path, said telecommunication system further comprising:

a controller having an input, a first output signal and a second output signal, said input receiving a request for information on one of said separate transmission channels of said upstream communication path from a requesting one of said plurality of CPE, said first output signal for routing said request for information to a selected one of said plurality of ISPS coupled upstream, said second output signal for routing said request for information to a selected one of said plurality of ISPS coupled downstream;

a receiver for receiving on one of said cable transmission channels of said downstream communication path said requested information from said selected one of said plurality of ISPS coupled upstream;

a multiplexer coupled to an output of said receiver and said second output of said controller, said multiplexer for multiplexing said requested information received from said selected one of said plurality of ISPS coupled upstream and said second output signal; and a plurality of cable distribution devices each coupled to said multiplexer and serving a plurality of CPE, an associated one of said plurality of cable distribution devices serving said requesting CPE, said associated cable distribution device receiving on said cable transmission channels of said downstream communication path one of said requested information transmitted by said selected one of said plurality of ISPS coupled upstream and said second output signal;

wherein when said associated cable distribution device receives said requested information transmitted by said selected one of said plurality of ISPS coupled upstream, said associated cable distribution device distributes said requested information on one of said cable transmission channels of said downstream communication path to said requesting CPE;

wherein when said associated cable distribution device receives said second output signal, said associated cable distribution device passes said request for information to said selected one of said plurality of ISPS coupled downstream, receives on one of said cable transmission channels of said downstream communication channel said requested information from said selected one of said plurality of ISPS coupled downstream, and distributes said requested information to said requesting CPE.

12. A telecommunication system as set forth in claim 11, wherein said request for information is comprised of a request for one of broadcast data and video data from one of said plurality of ISPS coupled upstream, and a request for one of interactive data services from one of said plurality of ISPS coupled downstream.

13. A telecommunication system as set forth in claim 11, wherein said associated cable distribution device distributes a composite signal on said one of said cable transmission channels of said downstream communication path to said requesting CPE, wherein said composite signal includes said requested information transmitted by said selected one of said plurality of ISPS coupled upstream and said requested information transmitted by said selected one of said plurality of ISPS coupled downstream.

14. A telecommunication system for communicating between a plurality of information service provider systems (ISPS) and a plurality of customer premise equipment (CPE), said telecommunication system using cable transmission channels for transmitting information on a downstream communication path from said plurality of ISPS to said plurality of CPE and separate transmission channels for transmitting requests for information on an upstream communication path from said plurality of CPE to said plurality of ISPS, said telecommunication system comprising a plurality of ISPS coupled at one end of said upstream communication path and a plurality of ISPS coupled on said downstream communication path, said telecommunication system further comprising:

a plurality of transmitters, each transmitter for transmitting a request for information from a requesting one of said plurality of CPE on one of said separate transmission channels, each request identifying said requesting CPE and a selected ISPS from one of said plurality of remote ISPS and said plurality of local ISPS;

a plurality of first receivers, each of said first receivers coupled to an associated transmitter for receiving said request for information therefrom;

a controller coupled to each of said plurality of first receivers, said controller having an input, a first output signal and a second output signal, said input for receiving said request for information, said first output signal for routing said request for information to a selected one of said plurality of remote ISPS, said second output signal for routing said request for information to a selected one of said plurality of local ISPS, said routing based upon a value of said selected ISPS within said request;

a second receiver for receiving on one of said cable transmission channels said requested information from said selected one of said plurality of remote ISPS;

a multiplexer coupled to an output of said second receiver and said second output of said controller, said multiplexer for multiplexing said requested information received from said selected one of said plurality of remote ISPS and said second output signal; and a plurality of cable distribution devices each coupled to said multiplexer and serving a plurality of CPE, an associated one of said plurality of cable distribution devices serving said requesting CPE, said associated cable distribution device receiving on said cable transmission channels one of said requested information transmitted by said selected one of said plurality of remote ISPS and said second output signal;

wherein when said associated cable distribution devices receives said requested information transmitted by said selected one of said plurality of remote ISPS, said associated cable distribution devices distributes said requested information on one of said cable transmission channels to said requesting CPE;

wherein when said associated cable distribution devices receives said second output signal, said associated cable distribution devices passes said request for information to said selected one of said plurality of local ISPS, receives on one of said cable transmission channels said requested information from said selected one of said plurality of local ISPS, and distributes said requested information to said requesting CPE.

15. A method for accessing information, comprising steps of:

originating a request for a specific type of information and transmitting the request to a communications network;

for a first type of information request, fulfilling the request by routing the request to a first type of information provider and transmitting the requested information to a first input of a combiner via a receiver unit;

for a second type of information request, fulfilling the request by routing the request to a second type of information provider, via said receiver unit, and transmitting the requested information to a second input of said combiner; and delivering the requested type or types of information from an output of said combiner to an appropriate destination device.

16. A method as in claim 15, wherein the first type of information is comprised of non-interactive data, and wherein the second type of information is comprised of interactive data.

17. A method as in claim 15, wherein the first type of information is comprised of one of video data or broadcast data, and wherein the second type of information is comprised of interactive data.

18. A method as in claim 15, wherein the second type of information provider is coupled to the internet.

19. A method as in claim 15, wherein the step of delivering is comprised of a step of transmitting the requested type or types of information to the appropriate destination device through a coaxial cable.

20. A method as in claim 15, wherein the step of delivering is comprised of a step of transmitting the requested type or types of information to the appropriate destination device through a cable television infrastructure.

21. A system for accessing information, comprising:

a data processor for originating a request for a specific type of information and for transmitting the request to a communications network;

circuitry coupled to said communications network that is responsive to a first type of information request for fulfilling the request by routing the request to a first type of information provider, said first type of information provider having an output for transmitting the requested information to a first input of a combiner via a receiver unit, said circuitry being further responsive to a second type of information request for fulfilling the request by routing the request to a second type of information provider, via said receiver unit, said second type of information provider having an output for transmitting the requested information to a second input of said combiner; and a delivery system for delivering the requested type or types of information from an output of said combiner to an appropriate destination device through a cable used to convey cable television signals.

22. A system as in claim 21, wherein the first type of information is comprised of non-interactive data, and wherein the second type of information is comprised of interactive data.

23. A system as in claim 21, wherein the first type of information is comprised of one of video data or broadcast data, and wherein the second type of information is comprised of interactive data.

24. A system as in claim 21, wherein the second type of information provider is coupled to the internet.

* * * * *